Aug. 14, 1956  J. GREENBLATT  2,758,622
ADJUSTABLE NUT AND LOBSTER CRACKER
Filed Nov. 17, 1954
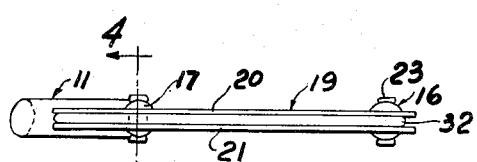
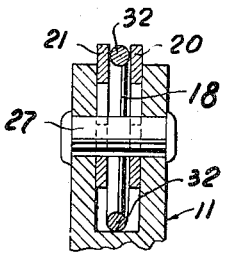
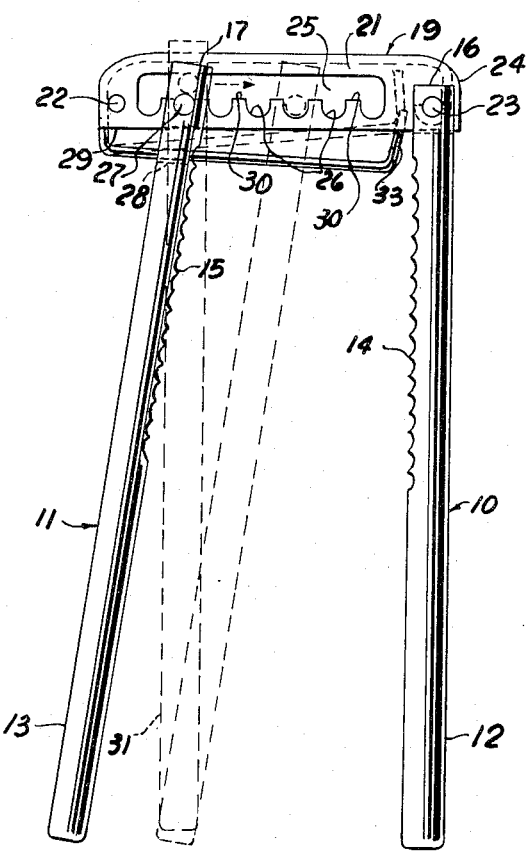
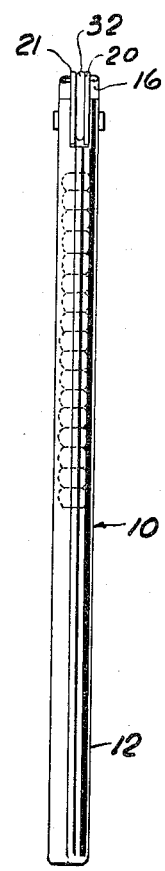
Fig. 1.  Fig. 4.
Fig. 2.  Fig. 3.
INVENTOR
JOSEPH GREENBLATT
BY L. S. Saulsbury
ATTORNEY

United States Patent Office 2,758,622
Patented Aug. 14, 1956

2,758,622

ADJUSTABLE NUT AND LOBSTER CRACKER

Joseph Greenblatt, Brooklyn, N. Y.

Application November 17, 1954, Serial No. 469,473

1 Claim. (Cl. 146—13)

This invention relates to an adjustable lobster and nut cracker.

It is an object of this invention to provide a cracker which is readily adjustable to receive different sizes of lobster and nuts.

It is another object of the invention to provide means for automatically maintaining any desired adjustment of the cracker.

It is a further object of the invention to provide means for automatically fixing the position of the adjustable handle when the cracker is not in use.

Other objects of the invention are to provide an adjustable nut and lobster cracker having the above objects in mind which is of simple construction, inexpensive to manufacture, compact, attractive and easy to use.

For a better understanding of the invention, reference may be had to the following detailed description taken in connection with the accompanying drawing, in which:

Figure 1 is a top plan view of the lobster and nut cracker, the handle parts being separated;

Fig. 2 is a front elevational view of the device shown in Fig. 1;

Fig. 3 is a side elevational view of the same device; and

Fig. 4 is a fragmentary enlarged sectional view taken along the line 4—4 of Fig. 1.

Referring now to the figures, 10 and 11 represent a pair of lever members having handle portions 12 and 13 respectively, and toothed portions 14 and 15 for gripping purposes. The end portions of lever members 10 and 11 are bifurcated at 16 and 17 at the ends opposite the handle members to provide open ended slots 18, as shown in Fig. 4.

An elongated connecting member 19, shown in detail in Figs. 2 and 4, consists of a pair of flat, spaced plates 20 and 21 maintained in parallel assembled relation by pin 22 passing through openings at one end of the plates and by transverse pin 23 passing through openings at the other end of the plates and also through openings in the bifurcated portion 16 of fixed lever member 10, as will be described in detail subsequently. The connecting member 19 has a longitudinal slot 25, closed at both ends and having a plurality of rounded notches 26 along one side.

The end 24 of connecting member 19 and the bifurcated portion 16 of adjustable lever member 10 have openings for receiving a pin. The end 24 of the connecting member is placed within the furcation 16 so that the openings are aligned and a transverse pin 23 is passed through these aligned openings. The ends of the pin 23 are peened over so that the two members are permanently connected.

The portion of connecting member 19 adjacent the notches 26 is placed within the furcation of lever members 11 and a transverse fulcrum pin 27 is passed through suitable openings in the bifurcated portion 17 of the lever member. The width of the furcation is somewhat greater than the thickness of the connecting member so as to permit free relative movement between the two members, and the distance between fulcrum pin 27 and the bottom 28 of the furcation of lever member 11 is great enough so that when the lever member is pressed upwardly against the bottom 29 of the connecting member 19, the fulcrum pin 27 will be above the elevations 30 between the notches 26 as shown in the broken line representation 31 of the lever member. The raised lever member can be moved along the slot 25 and the fulcrum pin 27 inserted in any one of the notches 26 to give the desired jaw opening.

A length of spring strip or wire 32 serves to hold fulcrum pin 27 in the particular notch in which it is placed and also to maintain lever member 11 at right angles to connecting member 19 when the nut cracker is not in use. One end of the spring wire 32 is fixed by bending it under pin 23. The spring wire is then carried upwardly along the end of the connecting member along its top, entering into the space between the plate members 20 and 21 and retained thereby or by a suitable recess or groove, if connecting member 19 is of one piece, down the opposite end and finally along the bottom of the connecting member, passing through the furcation of lever member 11. The end 33 of the spring wire 32 is bent upwardly at a point beyond the slot 25. The spring wire presses against the bottom 28 of the furcation and thus holds fulcrum pin 27 in any desired notch. When it is desired to adjust the jaw opening, the lever member 11 is simply pressed upwardly against the spring wire so that the fulcrum pin is above the elevations between the notches. It will also be seen that the pressure of the spring wire against the bottom of the furcation will tend to hold lever member 11 at right angles to connecting member 19.

In addition to its utility as a nut cracker, my improved adjustable device may be used to tighten or loosen bottle caps or to crack lobster shells.

While various changes may be made in the detail construction, it shall be understood that such changes shall be within the spirit and scope of the present invention as defined by the appended claim.

What is claimed is:

A nut and lobster cracker comprising a fixed lever, an adjustable lever, each lever having one end bifurcated, a toothed portion and a handle, said levers being arranged so that their toothed portions oppose each other to grip a nut or lobster claw, the bifurcation of the adjustable lever being longer than the bifurcation of the fixed lever, a pair of flat spaced parallel plates having one end filling the bifurcation of the fixed lever and engaging the bottom thereof, a pin extending through the bifurcation of the fixed lever and the one end of the pair of plates, whereby the plates and the fixed lever are held in fixed angular relationship with respect to each other, a member extending between the plates at the other end thereof, said spaced plates having aligned elongated slots closed at both ends with a plurality of notches extending along one side thereof, the longer bifurcation of the adjustable lever receiving said plates, a pin extending through the bifurcation of the adjustable lever and adapted to be registrable with any of the respective notches of the plates and being sufficiently spaced from the bottom of the bifurcation of the adjustable lever to allow the pin to be disengaged from any of the notches of the plates for adjustment to another notch, whereby to accommodate the levers to different sized nuts or lobster claws, a wire spring member disposed between the spaced plates, said wire spring member having one end anchored upon the first pin that fixes the plates to the bifurcation of the fixed lever and extending over said member at the opposite end of the spaced plates, through the longer bifurcation of the adjustable lever to engage the bottom thereof and along the inner side of the spaced plates, said wire spring member further having a turned up free end that extends into the space between the spaced plates to guide the spring member against lateral displacement as it is flexed by the movement of the adjustable lever, said wire spring member being of sufficient strength to support the adjustable lever against collapse upon the fixed lever and its pin within the notches of the plates in any location therealong to which it has been adjusted.

References Cited in the file of this patent

UNITED STATES PATENTS

| | | |
|---|---|---|
| 793,257 | Williams | June 27, 1905 |
| 1,129,213 | McEwan | Feb. 23, 1915 |

FOREIGN PATENTS

| | | |
|---|---|---|
| 11,352 | Great Britain | 1913 |